United States Patent
Elomari et al.

(10) Patent No.: US 10,934,493 B1
(45) Date of Patent: Mar. 2, 2021

(54) EXTRACTION OF HEAVY POLYNUCLEAR AROMATICS FROM HEAVY OIL

(71) Applicant: CHEVRON U.S.A. INC., San Ramon, CA (US)

(72) Inventors: Saleh Ali Elomari, Fairfield, CA (US); Huping Luo, Moraga, CA (US); Hye-Kyung Cho Timken, Albany, CA (US); Jeff William Johns, Draper, UT (US)

(73) Assignee: CHEVRON U.S.A. INC., San Ramon, CA (US)

( * ) Notice: Subject to any disclaimer, the term of this patent is extended or adjusted under 35 U.S.C. 154(b) by 3 days.

(21) Appl. No.: 16/692,007

(22) Filed: Nov. 22, 2019

(51) Int. Cl.
  *C10G 67/06* (2006.01)
  *C10G 25/00* (2006.01)

(52) U.S. Cl.
  CPC ........... *C10G 67/06* (2013.01); *C10G 25/003* (2013.01); *C10G 2300/1096* (2013.01)

(58) Field of Classification Search
  None
  See application file for complete search history.

(56) References Cited

U.S. PATENT DOCUMENTS

| | | | | |
|---|---|---|---|---|
| 3,565,832 | A * | 2/1971 | Bilow et al. | C08G 61/10 528/396 |
| 4,751,291 | A * | 6/1988 | Thiem | C07H 5/02 536/18.4 |
| 5,580,948 | A * | 12/1996 | Neufeld | B01J 19/24 526/65 |
| 8,574,426 | B2 | 11/2013 | Mezza et al. | |
| 2018/0187100 | A1 | 7/2018 | Koseoglu | |

OTHER PUBLICATIONS

F. Coleman, G. Srinivasan and M. Swadzba-Kwasny "Liquid Coordination Complexes Formed by the Heterolytic Cleavage of Metal Halides" Angew. Chem. Int. Ed. 2013, 52, 12582-12586.

* cited by examiner

*Primary Examiner* — Tam M Nguyen

(57) ABSTRACT

A process is provided for removing a heavy polynuclear aromatic (HPNA) compound from a hydrocarbon oil. The process includes contacting the hydrocarbon oil containing the HPNA compound with a lean hydrocarbon-immiscible liquid stream to produce a mixture comprising the hydrocarbon oil and a rich hydrocarbon-immiscible liquid containing the HPNA compound; and separating the mixture to produce a hydrocarbon oil effluent having a reduced level of the HPNA compound and a hydrocarbon-immiscible liquid effluent containing the HPNA compound. The hydrocarbon-immiscible liquid can be a halometallate ionic liquid, a liquid coordination complex, or a combination thereof.

21 Claims, 4 Drawing Sheets

EXTRACTION OF HEAVY POLYNUCLEAR AROMATICS FROM HEAVY OIL

FIELD

This disclosure relates to processes for removing one or more heavy polynuclear aromatic compounds from a hydrocarbon oil using halometallate ionic liquids and/or liquid coordination complexes.

BACKGROUND

Heavy polynuclear aromatic (HPNA) compounds may be an undesired secondary product of a hydrocracking process, particularly of high conversion hydrocracking units. Recycling unconverted oil to increase yields of distillate product can result in accumulation of HPNA compounds in the unconverted oil. Accumulated HPNA compounds in the recycle oil may deposit on the catalyst as coke, which may degrade catalyst performance and result in shorter catalyst cycle length. In addition, HPNA compounds can deposit on equipment in the cooler sections of the process unit. Production of HPNA compounds can be more pronounced for hydrocracking units processing heavier feeds. Thus, it would be desirable to remove HPNA compounds from the unconverted oil to minimize catalyst deactivation and equipment fouling.

SUMMARY

A process for removing a heavy polynuclear aromatic (HPNA) compound from a hydrocarbon oil, the process comprising (a) contacting the hydrocarbon oil comprising the HPNA compound with a lean hydrocarbon-immiscible liquid to produce a mixture comprising the hydrocarbon oil and a rich hydrocarbon-immiscible liquid comprising the HPNA compound, wherein the hydrocarbon-immiscible liquid comprises at least one of: (i) a halometallate ionic liquid comprising an organic cation and a halometallate anion; and (ii) a liquid coordination complex comprising a metal halide of formula $MX_3$, wherein M is a trivalent metal and X is a halide, and a Lewis basic donor ligand; and (b) separating the mixture to produce a hydrocarbon oil effluent and a hydrocarbon-immiscible liquid effluent comprising the HPNA compound.

DETAILED DESCRIPTION

Definitions

Figure 1:
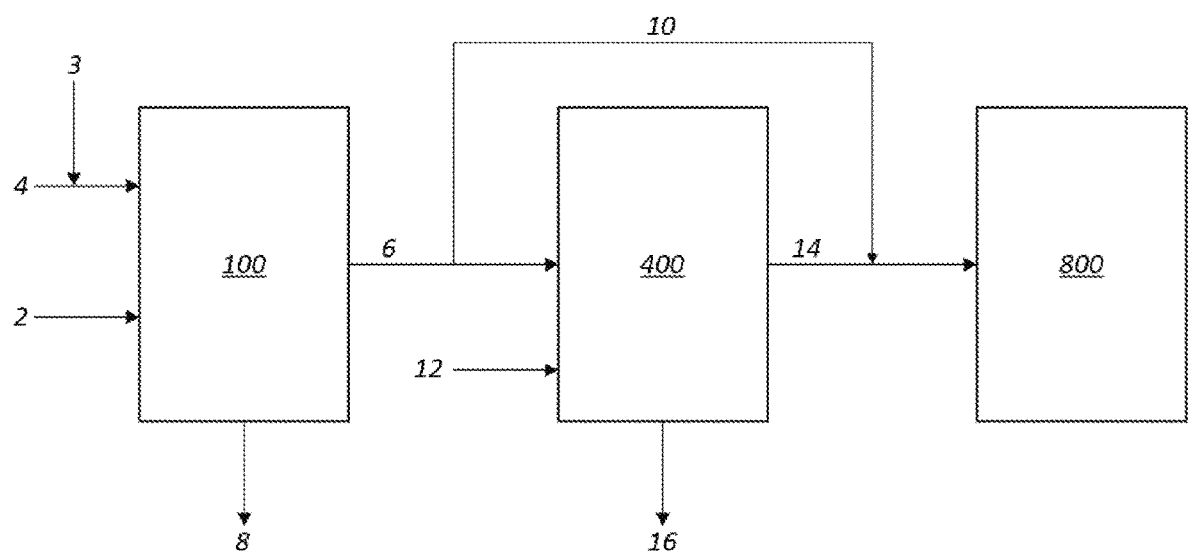
FIG. 1 is a simplified flow scheme illustrating various aspects of the present disclosure.

As used herein, the term "heavy polynuclear aromatic" (HPNA) means a fused ring polycyclic aromatic compound having 4 or more rings typically produced in a hydrocracking reaction zone. Examples of HPNA compounds include benzoperylenes (6 rings), coronenes (7 rings), benzocoronenes (8 rings), dibenzocoronenes (9 rings), and ovalene (10 rings). The aromatic structure may have alkyl groups or naphthenic rings attached to it. HPNA compounds with fewer than 5 rings (e.g., pyrene derivatives) can be hydrogenated more easily and thus are less likely to deactivate catalysts.

The term "hydrocarbyl group" is used herein in accordance with the definition specified by the International Union of Pure and Applied Chemistry (IUPAC): a univalent group formed by removing a hydrogen atom from a hydrocarbon. Hydrocarbyl groups include, by way of example, alkyl, alkenyl, cycloalkyl, cycloalkenyl, aryl, arylalkyl, alkylaryl groups, amongst other groups.

The term "cut point" means the temperature at which the T95 of the lighter material and a T5 of a heavier material are the same.

The term "T5" or "T95" means the temperature at which 5 mass percent or 95 mass percent, as the case may be, respectively, of the sample boils. When determining a boiling point or a boiling range for a feed or product fraction, an appropriate ASTM test method can be used, such as the procedures described in ASTM D2887, D2892, and/or D86. Preferably, ASTM D2887 should be used unless a sample is not appropriate for characterization based on ASTM D2887. For example, for samples that will not completely elute from a chromatographic column, ASTM D7169 can be used.

The term "end point" means the temperature at which the sample has all boiled off.

The term "about" means within 10% of the value, or within 5%, or within 1%.

Hydrocarbon Oil

The hydrocarbon oil containing a HPNA compound can be an unconverted oil (UCO) from a hydrocracking unit. UCO is a high boiling hydrocarbon fraction, separated from the hydrocracker effluent, that can boil at temperatures above those representative of diesel boiling range hydrocarbons. As used herein, "diesel boiling range" means hydrocarbons having a T5 between about 150° C. and about 200° C. and the diesel "cut point" comprising a T95 between about 343° C. and 399° C.

A typical hydrocracking feedstock is a vacuum gas oil (VGO) stream. VGO can include hydrocarbons having a boiling temperature in a range of about 343° C. to 565° C. Heavy feedstreams such as demetallized oil (DMO) or deasphalted oil (DAO), alone or blended with VGO can be processed in a hydrocracking unit. Undiluted DMO or DAO can also be processed, but typically under more severe conditions, since the DMO or DAO stream contains a higher concentration of impurities (e.g., nitrogen, sulfur and HPNA precursors) than the VGO stream. DAO denotes an oil from which a fraction of asphaltenes has been removed and can include hydrocarbons having a boiling temperature in a range of about 300° C. to about 900° C. (e.g., about 350° C. to 850° C., or about 400° C. to about 800° C.).

The distillation end point of UCO is generally close to that of the feedstock to the hydrocracking unit. When VGO is used as a major component of, or as the entire, fresh feed component, the hydrocarbon oil typically has a T99 of no more than about 593° C. (e.g., about 510° C. to 593° C.), and often at most about 565° C. When DAO is used as a component of, or as the entire, fresh feed component, UCO can have a distillation end point of at least about 700° C. (e.g., at least about 800° C.).

The hydrocarbon oil will typically comprise a plurality of HPNA compounds of different types in various amounts.

The total HPNA content of the hydrocarbon oil can be in a range of about 50 ppm to 5 wt. % or more. The HPNA content may be determined using high-performance liquid chromatography (HPLC) coupled with fluorescence analysis or by high resolution mass spectrometry or by the combination of any of these techniques. Representative HPNA compounds most easily identifiable and quantifiable by such analytical techniques include dibenzo[ghi]perylene, coronene and ovalene.

The hydrocarbon-immiscible liquid stream can remove one or more HPNA contaminants in the hydrocarbon oil. Thus, at least a portion of at least one type of HPNA compound may be removed from the hydrocarbon oil. The same or different amounts of each type of HPNA compound may be removed. In one aspect, up to 99 wt. % of the HPNA compounds can be removed. The HPNA content of the hydrocarbon oil may be reduced by at least 10 wt. % (e.g., at least 20 wt. %, at least 30 wt. %, at least 40 wt. %, at least 50 wt. %, at least 60 wt. %, at least 70 wt. %, at least 80 wt. %, at least 90 wt. %, at least 95 wt. %).

Hydrocarbon-Immiscible Liquid

Ionic liquids and liquid coordination complexes suitable for use herein are hydrocarbon-immiscible liquids. As used herein, the term "hydrocarbon-immiscible liquid" means a halometallate ionic liquid, a liquid coordination complex, or a combination thereof capable of forming a separate phase from the hydrocarbon oil under the operating conditions of the process. Halometallate ionic liquids and/or liquid coordination complexes that are miscible with hydrocarbon oil at the process conditions will be completely soluble with the hydrocarbon oil; therefore, no phase separation will be feasible. Thus, hydrocarbon-immiscible liquid may be insoluble with or partially soluble with the hydrocarbon oil under operating conditions. A halometallate ionic liquid and/or liquid coordination complex capable of forming a separate phase from the hydrocarbon oil under the operating conditions is considered to be hydrocarbon-immiscible. The hydrocarbon-immiscible liquid may be insoluble, partially soluble or completely soluble (miscible) with water.

Consistent with common terms of art, the hydrocarbon-immiscible liquid stream introduced to a contaminant removal zone may be referred to as a "lean" hydrocarbon-immiscible liquid stream generally meaning a hydrocarbon-immiscible liquid that is not saturated with one or more extracted HPNA compounds. Lean hydrocarbon-immiscible liquid may include one or both of fresh and regenerated hydrocarbon-immiscible liquid and is suitable for accepting or extracting HPNA compounds from the hydrocarbon oil. Likewise, the hydrocarbon-immiscible liquid effluent may be referred to as "rich", which generally means a hydrocarbon-immiscible liquid effluent produced by a contaminant removal step or process or otherwise including a greater amount of extracted HPNA compounds than the amount of extracted HPNA compounds included in the lean hydrocarbon-immiscible liquid. A rich hydrocarbon-immiscible liquid may require regeneration or dilution (e.g., with fresh hydrocarbon-immiscible liquid) before recycling the rich hydrocarbon-immiscible liquid to the same or another contaminant removal step of the process.

Halometallate Ionic Liquid

Ionic liquids comprise an organic cation and an anion where the anion is usually an inorganic anion. These materials are non-aqueous and have low melting points, often below 100° C., undetectable vapor pressure, and good chemical and thermal stability.

Halometallate ionic liquids comprise an organic cation and a halometallate anion. The halometallate ionic liquid can be any halometallate ionic liquid. There can be one or more halometallate ionic liquids. The mole ratio of the organic cation to halometallate anion is typically about 1:1.

The organic cation can be a nitrogen-based cation, a phosphorus-based cation, a sulfur-based cation, or a combination thereof. Suitable organic cations can include ammonium, pyrrolidinium, imidazolium, pyridinium, and phosphonium cations represented by structures (a) through (e), respectively:

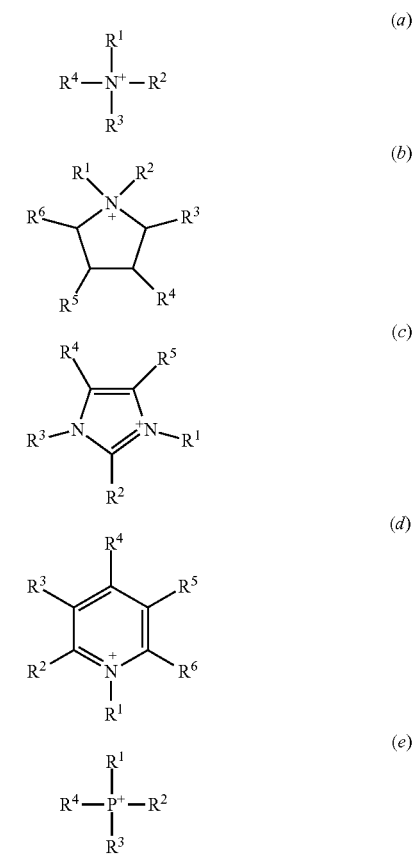

where $R^1$, $R^2$, $R^3$, $R^4$, $R^5$ and $R^6$ are each, independently of one another, selected from hydrogen and hydrocarbyl groups having from 1 to 20 carbon atoms (e.g., 1 to 12 carbon atoms, or 1 to 6 carbon atoms), wherein at least one of $R^1$, $R^2$, $R^3$ and $R^4$ is other than hydrogen in structures (a) and (e). Examples of organic cations include trialkylammonium, tetraalkylammonium, alkylpyrrolidinium, dialkylpyrrolidinium, alkylimidazolium, dialkylimidazolium, pyridinium, alkylpyridinium, dialkylpyridinium, trialkylphosphonium, and tetraalkylphosphonium cations. Mixtures of cations may be used as well.

The halometallate anion of the ionic liquid may contain a metal selected from Al, Ga, In, Fe, Cu, Zn, or combinations thereof, and a halide selected from F, Cl, Br, I, or combinations thereof. The halometallate anion can have a range of metal content. In some aspects, the metal is aluminum with the mole fraction of aluminum ranging from $0<Al<0.25$ in the anion. Suitable anions include $[AlCl_4]^-$, $[Al_2Cl_7]^-$, $[Al_3Cl_{10}]^-$, $[AlCl_3Br]^-$, $[Al_2Cl_6Br]^-$, $[Al_3Cl_9Br]^-$, $[Al_2I_7]^-$, $[GaCl_4]^-$, $[Ga_2Cl_7]^-$, $[Ga_3Cl_{10}]^-$, $[GaCl_3Br]^-$, $[Ga_2Cl_6Br]^-$, $[Ga_3Cl_9Br]^-$, $[InCl_4]^-$, $[In_2Cl_7]^-$, $[In_3Cl_{10}]^-$, $[InCl_3Br]^-$, $[In_2Cl_6Br]^-$, $[In_3Cl_9Br]^-$, $[FeCl_3]^-$, $[FeCl_4]^-$, $[Fe_3Cl_7]^-$, $[CuCl_2]^-$, $[Cu_2Cl_3]^-$, $[Cu_3Cl_4]^-$, and $[ZnCl_3]^-$.

In some aspects, the halometallate anion of the ionic liquid comprises a haloaluminate. In some aspects, the halometallate anion of the ionic liquid comprises a chloroaluminate. In some aspects, the halometallate comprises a heptachloroaluminate.

Suitable halometallate ionic liquids may include trimethylammonium heptachloroaluminate, tributyl(methyl)ammonium heptachloroaluminate, 1-butyl-1-methylpyrrolidinium heptachloroaluminate, 1-butyl-3-methylimidazolium heptachloroaluminate, 1-ethyl-3-methylimidazolium heptachloroaluminate, 1-butylpyridinium heptachloraluminate, tributyl(methyl)phosphonium heptachloroaluminate, tripropyl(pentyl)phosphonium heptachloroaluminate, or combinations thereof.

Liquid Coordination Complex

Liquid coordination complexes (LCCs) are a class of liquids that are composed of metallate cations and anions in equilibrium with neutral species. Liquid coordination complexes can be obtained by combining a neutral Lewis basic donor with a trivalent metal halide, such as Al(III) halides and Ga(III) halides. Without being bound by any particular theory, it is believed that the addition of a Lewis basic donor ligand (L) to a metal halide ($MX_3$) results in disproportionation of the metal species into cationic and anionic complexes which exist in equilibrium with neutral complexes, according to the following general schemes:

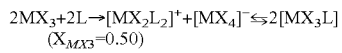
$2MX_3+2L \rightarrow [MX_2L_2]^+ + [MX_4]^- \leftrightarrows 2[MX_3L]$
($X_{MX3}=0.50$)

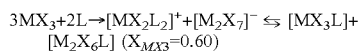
$3MX_3+2L \rightarrow [MX_2L_2]^+ + [M_2X_7]^- \leftrightarrows [MX_3L] + [M_2X_6L]$ ($X_{MX3}=0.60$)

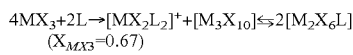
$4MX_3+2L \rightarrow [MX_2L_2]^+ + [M_3X_{10}]^- \leftrightarrows 2[M_2X_6L]$
($X_{MX3}=0.67$)

wherein M is a trivalent metal; X is a halide; and $X_{MX3}$ represents the mole fraction of $MX_3$.

Liquid coordination complexes are distinct from halometallate ionic liquids, which consist only of organic cations and halometallate anions, whereas LCCs are believed to comprise ionic species in equilibrium with neutral species. Furthermore, the active Lewis acidic species in halometallate ionic liquids is a $[M_2X_7]^-$ anion, and only its concentration can be manipulated. In contrast, in LCCs, the reactivity of a system depends on the ligand selected and on the molar ratio of ligands to the metal halide ($X_{MX3}$).

The metal (M) can be aluminum, gallium, indium, or a combination thereof.

The halide (X) can be F, Cl, Br, I, or a combination thereof. In some aspects, the halide can be Cl, Br, or a combination thereof.

In some aspects, the metal halide ($MX_3$) can be selected from $AlCl_3$ and $GaCl_3$. The metal halide can comprise two or more metal halides having the formula $MX_3$.

Where the metal (M) comprises or is aluminum, the molar ratio of the metal halide to the Lewis basic donor ligand can be in a range of from 1:1 ($X_{MX3}=0.50$) to 2:1 ($X_{MX3}=0.60$), such as from 55:45 ($X_{MX3}=0.55$) to 65:35 ($X_{MX3}=0.65$), or about 3:2 ($X_{MX3}=0.60$).

Where the trivalent metal (M) comprises or is gallium, the molar ratio of the metal halide to the Lewis basic donor ligand can be in a range of from 1:1 to 3:1, such as from 55:45 ($X_{MX3}=0.55$) to 75:25 ($X_{MX3}=0.75$), or about 3:2 ($X_{MX3}=0.60$).

The Lewis basic donor ligand can be any neutral organic compound containing a Lewis basis donor atom selected from one or more of oxygen, sulfur, nitrogen, and phosphorus. The Lewis basic donor ligand can be selected from one or more of ketones, esters, ethers, amides, ureas, nitriles, thioketones, thioesters, thioethers, thioamides, thioureas, phosphines, phosphine oxides, phosphine sulfides, and sulfoxides. The Lewis basic donor ligand can have a molecular weight of 500 g/mol or less (e.g., 400 g/mol or less, 300 g/mol or less, 200 g/mol or less, or 100 g/mol or less).

Suitable Lewis basic donor ligands can be selected from compounds having a chemical formula selected from $R^1$—C(Z)—$R^1$, $R^1$—C(O)—$ZR^1$, $R^1$—S(O)—$R^1$, $R^2NH$—C(Z)—$NHR^2$, $R^1$—C(O)$^-$N$(R^2)_2$, $(R^3)_3P(O)$, and $R^1$—CN, wherein each $R^1$ is independently a $C_1$ to $C_{10}$ alkyl group; each $R^2$ is independently hydrogen or a $C_1$ to $C_{10}$ alkyl group; each $R^3$ is independently a $C_4$ to $C_{10}$ alkyl group; and Z is oxygen or sulfur.

Suitable Lewis basic donor ligands can include urea, N,N'-dimethylurea, N,N'-dimethylthiourea, acetamide, N,N-dimethylacetamide, acetone, dimethylsulfoxide, and trioctylphosphine oxide (TOPO). The Lewis basic donor ligand can comprise a mixture of two or more Lewis basic donor ligands.

Suitable liquid coordination complexes can comprise $AlCl_3$ and a Lewis basic donor ligand selected from urea, N,N'-dimethylurea, N,N'-dimethylthiourea, acetamide, and N,N-dimethylacetamide in a molar ratio of $AlCl_3$ to ligand of from 1:1 ($X_{MCl3}=0.50$) to 2:1 ($X_{MCl3}=0.67$), such as from 55:45 ($X_{MCl3}=0.55$) to 65:35 ($X_{MCl3}=0.65$), or about 3:2 ($X_{MCl3}=0.60$).

Extraction Process

Solvent extraction, also referred to as liquid-liquid extraction or partitioning, is a method of separating compounds based on their relative solubilities, for example in at least two immiscible liquids. Liquid-liquid extraction is a basic chemical technique and is readily scalable. Thus, it may be applied on a smaller scale in laboratories using, for example, a separatory funnel, as well as on an industrial scale using, for example, large separation towers or columns discussed in more detail below.

The process for extracting HPNA contaminants from a hydrocarbon oil comprises a contacting step and a separating step. In the contacting step, a hydrocarbon oil containing one or more HPNA compounds and a hydrocarbon-immiscible liquid are mixed or otherwise brought into contact with each other. The contacting step may facilitate transfer or extraction of the one or more HPNA contaminants from the hydrocarbon oil to the hydrocarbon-immiscible liquid stream. Although a hydrocarbon-insoluble liquid stream that is partially soluble in the hydrocarbon oil may facilitate transfer of the HPNA contaminants from the hydrocarbon oil to the hydrocarbon-immiscible liquid, partial solubility is not required. Insoluble hydrocarbon oil/hydrocarbon-immiscible liquid mixtures may have sufficient interfacial surface area between the hydrocarbon oil and ionic liquid to be useful. In the separation step, the mixture of hydrocarbon oil and hydrocarbon-immiscible liquid settles or forms two phases, a hydrocarbon oil phase and a hydrocarbon-immiscible liquid phase, which are separated to form a hydrocarbon oil effluent and a hydrocarbon-immiscible liquid effluent.

The extraction process may be operated in batch, continuous, or semi-continuous mode.

The extraction process may be conducted in various equipment which is well known in the art and is suitable for batch or continuous operation. For example, in a small-scale form of the process, the hydrocarbon oil and the hydrocarbon-immiscible liquid may be mixed in a beaker, flask, or other vessel, e.g., by stirring, shaking, use of a mixer, or a magnetic stirrer. The mixing or agitation is stopped, and the mixture forms a hydrocarbon phase and a halometallate ionic liquid phase which can be separated, for example, by decanting, centrifugation or other means to produce a hydrocarbon oil effluent having a lower HPNA content relative to the hydrocarbon oil. The process also produces a hydrocarbon-immiscible liquid effluent comprising one or more HPNA contaminants.

In large-scale commercial operations, the process may occur in any suitable apparatus known in the art capable of performing liquid-liquid extraction. Examples of suitable apparatuses include SCHEIBEL© columns, KARR' columns, rotating disc contactor (RDC) columns, pulsed, packed (SMVP), and sieve tray columns. One or more extraction columns may be included in the process. Such columns are generally devices that contain alternating mixing and settling stages. They may be configured to act as a multiple phase system (e.g., two or more phases). Thus, the extraction process, including contacting the hydrocarbon oil containing one or more HPNA compounds with a lean hydrocarbon-immiscible liquid stream, may proceed through one or more extraction steps over the course of one or more stages.

The extraction process, including contacting the hydrocarbon oil containing one or more HPNA compounds with the lean hydrocarbon-immiscible liquid stream, may take place in a co-current mode, in which the immiscible liquids (e.g., the hydrocarbon oil and the hydrocarbon-immiscible liquid stream) flow in the same direction. Alternatively, the process may take place in a counter-current mode, where the immiscible liquids flow in opposite directions.

The contacting and separating steps can be repeated, for example, when the HPNA content of the hydrocarbon oil effluent is to be reduced further to obtain a desired HPNA level in the ultimate hydrocarbon product stream from the process. Each set, group, or pair of contacting and separating steps may be referred to as a contaminant removal step. Thus, the present process encompasses single and multiple contaminant removal steps. A contaminant removal zone may be used to perform a contaminant removal step. As used herein, the term "zone" can refer to one or more equipment items and/or one or more sub-zones. Equipment items may include, for example, one or more vessels, heaters, separators, exchangers, conduits, pumps, compressors, and controllers. The contaminant removal process or step may be conducted in a similar manner and with similar equipment as is used to conduct other liquid-liquid wash and extraction operations. Suitable equipment includes, for example, columns with: trays, packing, rotating discs or plates, and static mixers. Pulse columns and mixing/settling tanks may also be used.

The contacting step can take place at a temperature in a range of about 15° C. to less than the decomposition temperature of the ionic liquid or the liquid coordination complex (e.g., 15° C. to 200° C., 15° C. to 150° C., 15° C. to 80° C., 20° C. to 200° C., 20° C. to 150° C., or 20° C. to 80° C.).

The contacting step takes place in an inert atmosphere, such as nitrogen, helium, argon, and the like, without oxygen or moisture.

The contacting step typically takes place at atmospheric pressure, although higher or lower pressures could be used, if desired. The pressure can be in the range of about 100 kPa to 3 MPa.

The weight ratio of hydrocarbon oil to lean hydrocarbon-immiscible liquid introduced to the contacting step may range from 1:10,000 to 10,000:1 (e.g., 1:1000 to 1000:1, 1:100 to 100:1, 1:20 to 20:1, or 1:10 to 10:1). In some aspects, the weight of hydrocarbon oil is greater than the weight of hydrocarbon-immiscible liquid introduced to the contacting step.

When a combination of halometallate ionic liquid and liquid coordination complex is used, they are typically mixed before being introduced into the contacting vessel, although this is not required. The weight ratio of halometallate ionic liquid to liquid coordination complex can be in a range 1:1000 to 1000:1 (e.g., 1:100 to 100:1, 1:10 to 10:1, 1:4 to 4:1, or 1:2 to 2:1).

The contacting time is sufficient to obtain good contact between the hydrocarbon-immiscible liquid and the hydrocarbon oil. The contacting time can range of about 1 minute to 2 hours or more. The settling time can range from about 1 minute to 8 hours or more.

A paraffinic solvent may be added to the contacting step and/or separating step to facilitate the phase separation of the hydrocarbon oil and hydrocarbon-immiscible liquid. The paraffinic solvent can be any solvent which is capable of forming a separate phase from the hydrocarbon-immiscible liquid phase. There can be one or more paraffinic solvents. Often, the paraffinic solvent includes one or more normal paraffins (e.g., n-pentane, n-heptane) that solubilizes the heavy hydrocarbon material in the hydrocarbon oil. Heptane is a particularly suitable solvent, which may have a low solubility to HPNA compounds to facilitate their rejection. The paraffinic solvent solubilizes the heavy hydrocarbon paraffinic material in the hydrocarbon oil. The paraffinic solvent can include portions of fresh and make-up solvents. The weight ratio of paraffinic solvent to hydrocarbon oil can range from about 1:100 to about 100:1 (e.g., 1:100 to 10:1).

FIG. 1 is a flow scheme illustrating various embodiments of the present disclosure and some of the optional and/or alternate steps and apparatus encompassed by the disclosure. Hydrocarbon oil feed stream 2 and hydrocarbon-immiscible liquid stream 4 are introduced to and contacted and separated in contaminant removal zone 100 to produce contaminant rich hydrocarbon-immiscible liquid effluent stream 8 and hydrocarbon oil effluent stream 6 as described above. The hydrocarbon-immiscible liquid stream 4 may be comprised of fresh hydrocarbon-immiscible liquid stream 3. In one aspect, a portion or all of hydrocarbon oil effluent stream 6 is passed via conduit 10 to a hydrocarbon conversion zone 800. Hydrocarbon conversion zone 800 may, for example, comprise at least one of a fluid catalytic cracking (FCC) and a hydrocracking process, which are well known in the art.

An optional hydrocarbon washing step may be used, for example, to remove hydrocarbon-immiscible liquid that is entrained or otherwise remains in the hydrocarbon oil effluent stream 6 by using water to dissolve the hydrocarbon-immiscible liquid in the hydrocarbon oil effluent. The term "entrained" includes when the hydrocarbon-immiscible liquid is suspended, trapped, or dissolved in the hydrocarbon oil effluent. In this aspect, a portion or all of hydrocarbon oil effluent stream 6 (as feed) and a water stream 12 (as solvent) are introduced to hydrocarbon washing zone 400. The hydrocarbon oil effluent and water streams introduced to hydrocarbon washing zone 400 are mixed and separated to produce a washed hydrocarbon stream 14 and a spent water stream 16, which comprises the dissolved hydrocarbon-immiscible liquid. The hydrocarbon washing step may be conducted in a similar manner and with similar equipment as used to conduct other liquid-liquid wash and extraction operations as discussed above. Various hydrocarbon washing step equipment and conditions such as temperature, pressure, times, and solvent to feed ratio may be the same as or different from the contaminant removal zone equipment and conditions. In general, the hydrocarbon washing step conditions will fall within the same ranges as given for the contaminant removal step conditions. A portion or all of the washed hydrocarbon stream 14 may be passed to hydrocarbon conversion zone 800.

Alternatively, hydrocarbon-immiscible liquid that is entrained or otherwise remains in the hydrocarbon oil effluent stream may be removed from the hydrocarbon oil by contacting the effluent stream with a retaining material for retaining at least a portion of the entrained hydrocarbon-immiscible liquid. The retaining material may comprise an adsorbent material, although other materials may be used. Oxides and oxide materials such as silica, alumina, and silica-alumina could be used as adsorbents in granular, fiber, pellet, or other form. Other adsorbents may include ion exchange resins, activated carbon, clays, and molecular sieves. In some instances, it may be desirable to retain the hydrocarbon-immiscible liquid so as to minimize the amount of hydrocarbon-immiscible liquid that is passed to downstream equipment to avoid fouling or damaging the equipment. The hydrocarbon-immiscible liquid may be burned off of the spent or saturated adsorbent under calcination conditions which would regenerate spent adsorbent allowing the adsorbent to be reused. Alternatively, the spent adsorbent may be disposed of as a waste product and replaced with fresh adsorbent. In some instances, it may be desirable to recover some or all of the hydrocarbon-immiscible liquid from the retaining material. Accordingly, a solvent or a desorbent may be used to remove the hydrocarbon-immiscible liquid from the retaining material. For example, an ionic liquid precursor or liquid coordination complex precursor, a second and different ionic liquid or liquid coordination complex, inert liquid, benzene, and toluene may be used as a solvent. The desorbent could be something in which the hydrocarbon-immiscible liquid is soluble and operate via a solubility mechanism, such as a chlorosilane or an organic halide such as methylene chloride or chlorobenzene. In some cases, recovered hydrocarbon-immiscible liquid may not be in active form when recovered. The recovered hydrocarbon-immiscible liquid can be reactivated by addition of a reactivation agent, such as $AlCl_3$.

Figure 2A:
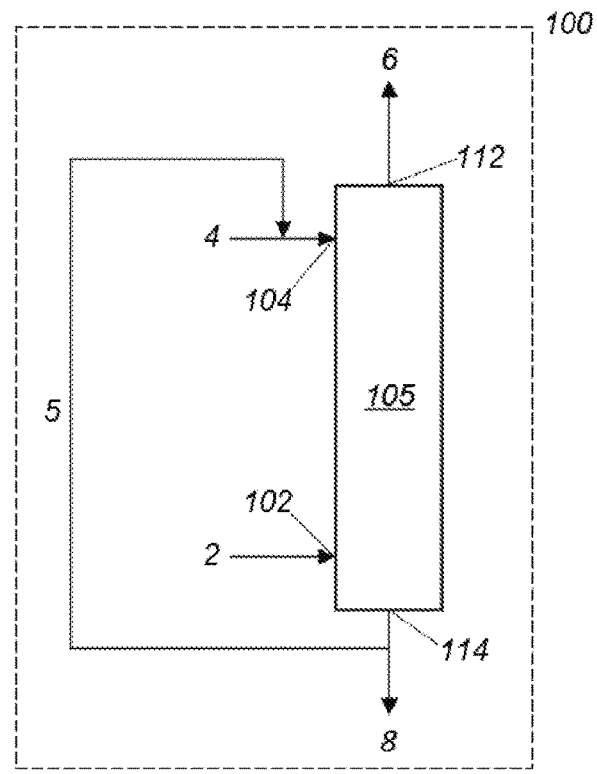
FIGS. 2A and 2B are simplified flow schemes illustrating different aspects of an extraction zone of the present disclosure.

FIG. 2A illustrates an aspect of the present disclosure which may be practiced in HPNA removal or extraction zone 100 that comprises a multi-stage, counter-current extraction column 105 wherein hydrocarbon oil and hydrocarbon-immiscible liquid streams are contacted and separated. The hydrocarbon oil feed stream 2 enters extraction column 105 through hydrocarbon feed inlet 102, and lean hydrocarbon-immiscible liquid stream 4 enters extraction column 105 through hydrocarbon-immiscible liquid inlet 104. In the Figures, reference numerals of the streams and the lines or conduits in which they flow are the same. Hydrocarbon oil feed inlet 102 is located below hydrocarbon-immiscible liquid inlet 104. The hydrocarbon oil effluent passes through hydrocarbon oil effluent outlet 112 in an upper portion of extraction column 105 to hydrocarbon oil effluent conduit 6. The hydrocarbon-immiscible liquid effluent including the HPNA contaminants removed from the hydrocarbon oil passes through hydrocarbon-immiscible liquid effluent outlet 114 in a lower portion of extraction column 105 to hydrocarbon-immiscible liquid effluent conduit 8.

Optionally, a portion or all of the hydrocarbon-immiscible liquid effluent stream 8 is recycled back to the top of extraction column 105 via conduit 5. In some aspects, when the HPNA concentration increases to a pre-determined level, a portion of the hydrocarbon-immiscible liquid effluent stream comprising the HPNA compound is drained out of the system via conduit 8. In some aspects, a slip stream of the hydrocarbon-immiscible liquid effluent stream comprising the HPNA compound is continuously purged from the system via conduit 8 and a lean hydrocarbon-immiscible liquid stream is continuously injected into the system via conduit 4 to maintain a certain HPNA concentration in the hydrocarbon-immiscible liquid circulation flow.

Figure 2B:
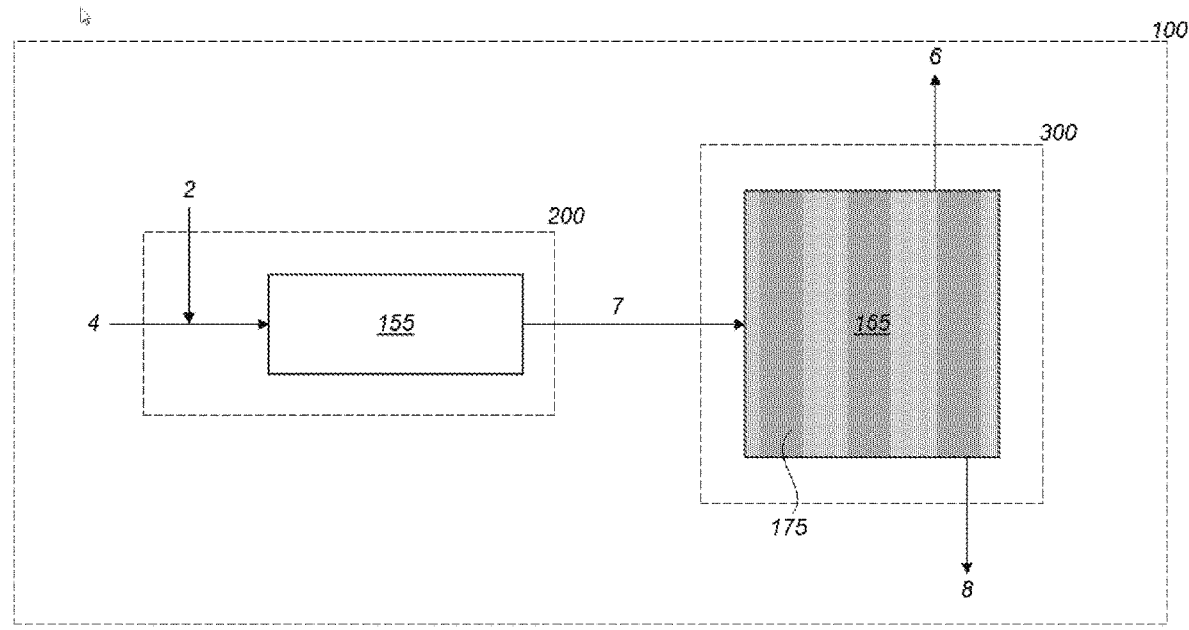

FIG. 2B illustrates another aspect of contaminant removal zone 100 that comprises a contacting zone 200 and a separation zone 300. In this aspect, lean hydrocarbon-immiscible liquid stream 4 and hydrocarbon oil feed stream 2 are introduced into the contacting zone 200 and mixed by introducing hydrocarbon oil feed stream 2 into the flowing lean hydrocarbon-immiscible liquid stream 4 and passing the combined streams through static in-line mixer 155. Static in-line mixers are well known in the art and may include a conduit with fixed internals such as baffles, fins, and channels that mix the fluid as it flows through the conduit. In other aspects, not illustrated, lean hydrocarbon-immiscible liquid stream 4 may be introduced into hydrocarbon oil feed stream 2. In another aspect, lean hydrocarbon-immiscible liquid stream 4 and hydrocarbon oil feed stream 2 are separately introduced into the static in-line mixer 155. In other aspects, the streams may be mixed by any method known in the art, including stirred tank and blending operations. The mixture comprising hydrocarbon oil and hydrocarbon-immiscible liquid is transferred to separation zone 300 via transfer conduit 7. Separation zone 300 comprises separation vessel 165 wherein two phases are allowed to separate into a rich hydrocarbon-immiscible liquid phase which is withdrawn from a lower portion of separation vessel 165 via hydrocarbon-immiscible effluent conduit 8 and a hydrocarbon phase which is withdrawn from an upper portion of separation vessel 165 via hydrocarbon oil effluent conduit 6. Separation vessel 165 may comprise a boot, not illustrated, from which contaminant rich hydrocarbon-immiscible liquid is withdrawn via conduit 8.

Separation vessel 165 may contain a solid media 175 and/or other coalescing devices which facilitate the phase separation. In other aspects, the separation zone 300 may comprise multiple vessels which may be arranged in series, parallel, or a combination thereof. The separation vessels may be of any shape and configuration to facilitate the separation, collection, and removal of the two phases. In a further aspect, contaminant removal zone may include a single vessel wherein lean hydrocarbon-immiscible liquid stream 4 and hydrocarbon oil feed stream 2 are mixed, then remain in the vessel to settle into the hydrocarbon oil effluent and rich hydrocarbon-immiscible liquid phases.

In an aspect, the process can comprise two or more contaminant removal steps. For example, the hydrocarbon oil effluent from one contaminant removal step may be passed directly as the hydrocarbon feed to a second contaminant removal step. In another aspect, the hydrocarbon oil effluent from one contaminant removal step may be treated or processed before being introduced as the hydrocarbon feed to the second contaminant removal step. There is no requirement that each contaminant removal zone comprises the same type of equipment. Different equipment and conditions may be used in different contaminant removal zones.

Figure 3:
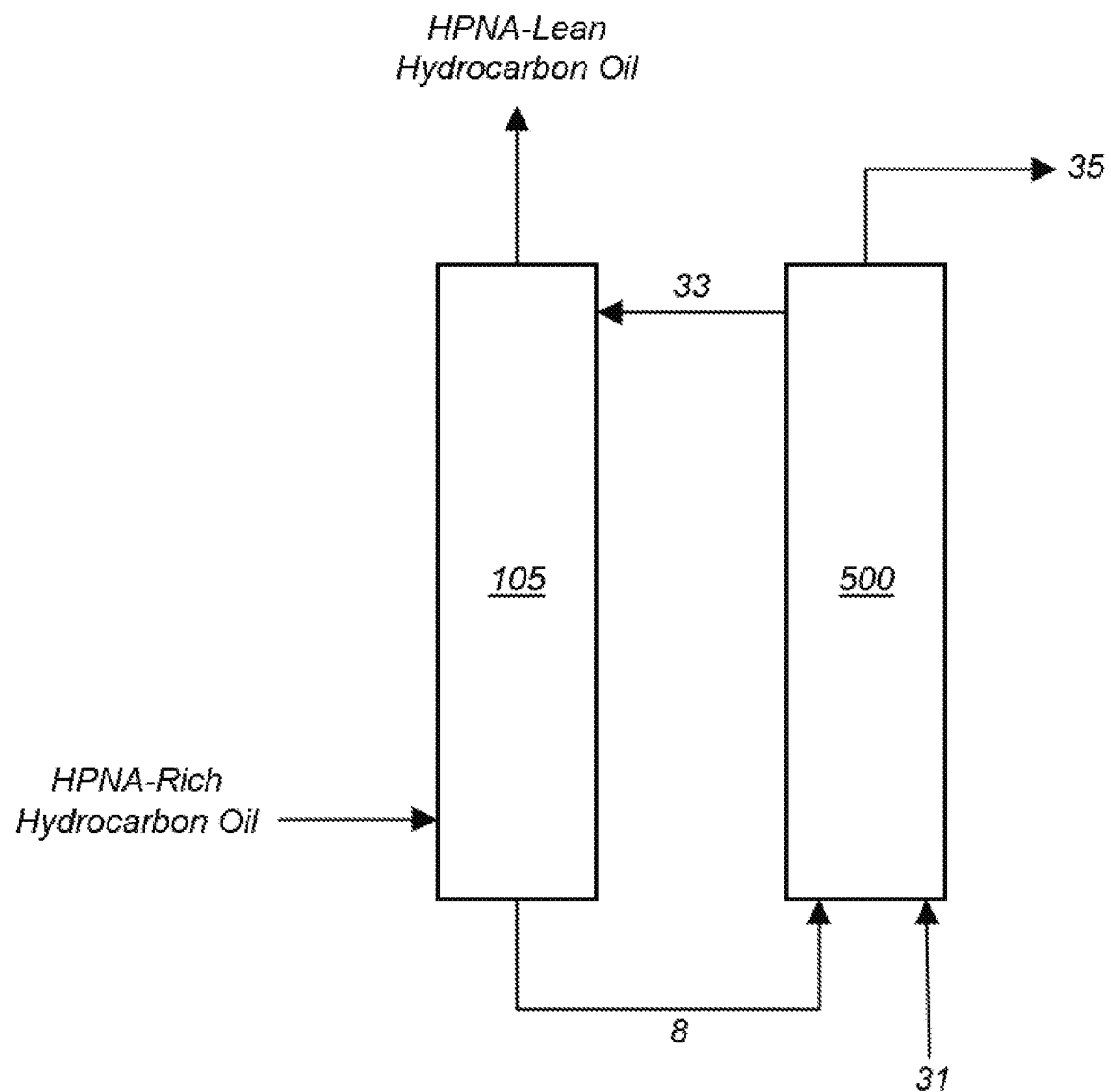
FIG. 3 is a simplified process flow diagram illustrating one aspect of a hydrocarbon-immiscible liquid regeneration process.

An optional regeneration step may be used, for example, to regenerate the ionic liquid or LCC by removing the HPNA compound from the ionic liquid or LCC (i.e., reducing the HPNA content of the hydrocarbon-immiscible liquid effluent). In one aspect illustrated in FIG. 3, a portion or all of the hydrocarbon-immiscible effluent stream 8 comprising the HPNA compound is introduced to hydrocracking zone 500. The hydrocarbon-immiscible effluent stream 8 comprising the HPNA compound is contacted with hydrogen 31 under hydrocracking conditions with or without a hydrocracking catalyst. Any conventional hydrocracking reactor can be used. When regeneration is conducted without a catalyst, a bubble column can be used where trays are used to separate the reactor into several vertical compartments and hydrogen 31 is provided to a lower portion of the reactor, allowing a plug-flow scheme for both hydrogen 31 and the hydrocarbon-immiscible effluent stream 8 comprising the HPNA compound. In hydrocracking zone 500, a portion or all of HPNA compounds having less than 5 rings are "cracked" to form lower molecular weight hydrocarbons. The process typically also generates light side products including hydrogen, carbon oxides, light ends, and water. The light ends represent a mix of low weight hydrocarbon compounds, such as methane or ethane. These light gas products are removed in an off-gas stream in an upper portion of regeneration zone 500 via conduit 35. A portion or all of the regenerated hydrocarbon-immiscible liquid is recycled via conduit 33 back to multi-stage, counter-current extraction column 105 after cooling down to the extraction temperatures.

Suitable hydrocracking catalysts include amorphous silica-alumina bases or low-level zeolite bases combined with one or more Group VIII or Group VIB metal hydrogenating components, or a crystalline zeolite cracking base upon which is deposited a Group VIII metal hydrogenating component. Hydrocracking conditions may include a temperature of 149° C. to 468° C. (300° F. to 875° F.), a pressure of 2.1 to 20.7 MPa (300 to 3000 psig), a liquid hourly space velocity (LHSV) of 0.05 to less than 2.5 h$^{-1}$, and a hydrogen rate of 51 to 2527 Nm$^3$/m$^3$ (300 to 15,000 scf/bbl).

Figure 4:
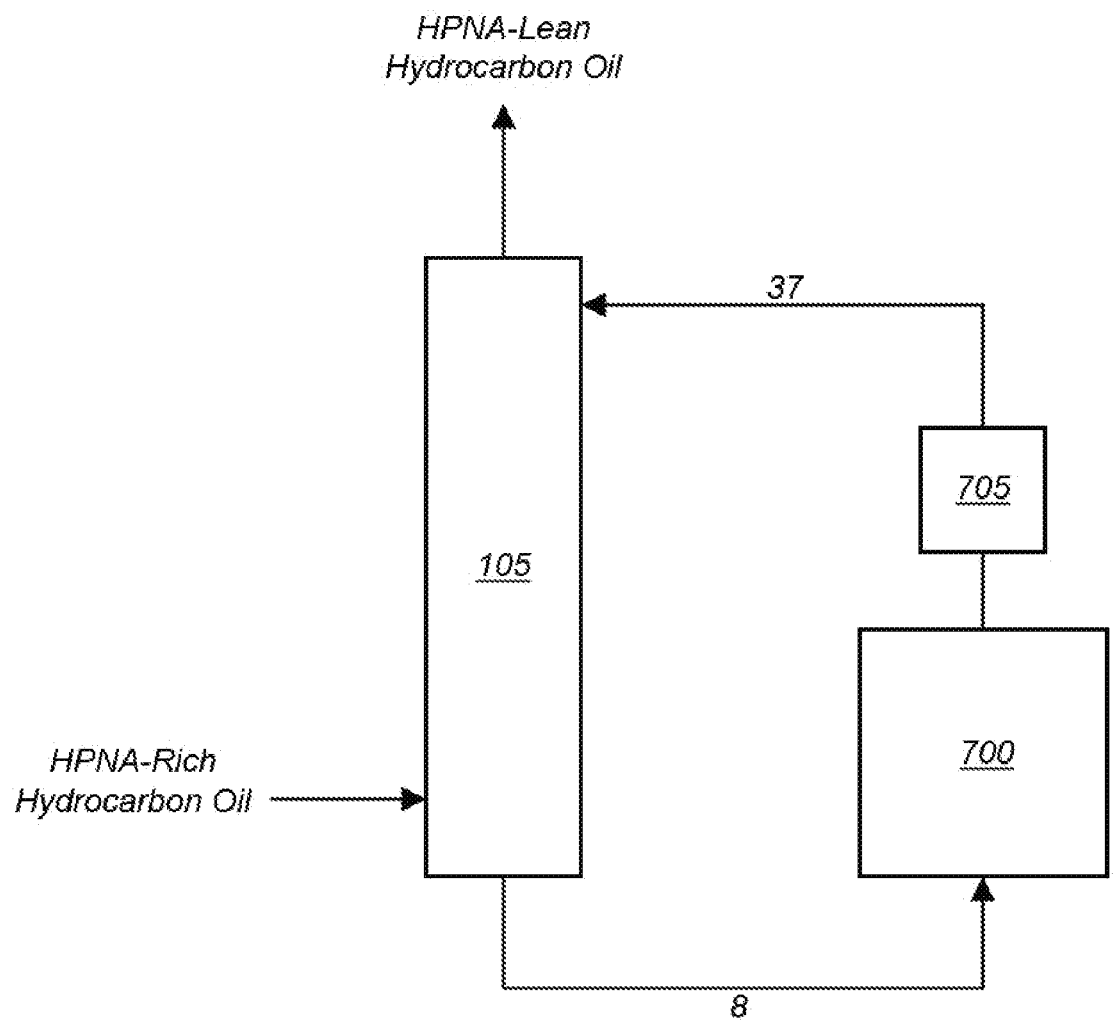
FIG. 4 is a simplified process flow diagram illustrating another aspect of a hydrocarbon-immiscible liquid regeneration process.

Regeneration of the hydrocarbon-immiscible liquid effluent containing the HPNA compound can comprise crystallizing the HPNA compound from the rich hydrocarbon-immiscible liquid effluent. In one aspect illustrated in FIG. 4, a portion or all of the hydrocarbon-immiscible effluent stream 8 comprising the HPNA compound is introduced to crystallization zone 700. The crystallization zone 700 can include one or more crystallizers. One or more crystallizers are used to facilitate the crystallization of the HPNA compound at lower temperatures. The crystallized HPNA compound is separated from the solvent in a separator zone 705. The separator zone 705 can include one or more of filters, centrifuges, and dryers, as is known in the art. A portion or all of the regenerated hydrocarbon-immiscible liquid is recycled via conduit 37 back to multi-stage, counter-current extraction column 105.

Regeneration of the hydrocarbon-immiscible liquid effluent can comprise contacting the hydrocarbon-immiscible liquid effluent rich in HPNA compounds with a polar organic solvent in a separation unit for a time sufficient to form a solution of the HPNA compound in the polar organic solvent. A portion or all of the HPNA compound will be transferred to the organic phase allowing for the HPNA compound to be removed from the hydrocarbon-immiscible liquid. Regenerated hydrocarbon-immiscible liquid can be recovered from the separation unit and recycled to the contaminant removal zone. The polar organic solvent containing the HPNA compound can be sent to a solvent recovery unit where a solvent stream can be recovered and recycled to the separation unit.

Recovered HPNA compounds can be further processed in a delayed coker to produce high quality coke, and/or gasified to produce hydrogen, steam and electricity, and/or can be sent to the fuel oil pool as blending components, and/or can be sent to an FCC unit to form a small portion of the FCC feedstream and eventually be deposited as coke on the catalyst, which coke will be burned to produce heat in the catalyst regeneration step, and/or can be sent to the asphalt pool.

EXAMPLES

The following illustrative examples are intended to be non-limiting.

Example 1

Synthesis of N-Butylpyridinium Chloroaluminate Ionic Liquid ([C$_4$Py][Al$_2$Cl$_7$])

N-Butylpyridinium chloroaluminate was synthesized in a glove box under N$_2$ atmosphere by slowly mixing 2:1 mole ratio of anhydrous AlCl$_3$ powder and dried N-butylpyridinium chloride powder together. Slight heat was applied to ~50° C. while stirring, and the mixture became liquid. Then a small fraction of each solid at a time was added alternately to the beaker to continue to make the molten liquid until all ingredients are added and dissolved well. The liquid was stirred overnight and then filtered with a fine frit to remove any residual solid. The composition of this ionic liquid is shown in Table 1.

Example 2

Synthesis of Liquid Coordination Complexes

Example 2-1: Synthesis of Chloroaluminate Liquid Coordination Complex Acetamide-AlCl$_3$ A liquid coordination complex made of 3:2 molar ratio of anhydrous aluminum chloride and acetamide was prepared by using 413.9 g of anhydrous AlCl$_3$ and 122.1 g of acetamide (CH$_3$CONH$_2$). As-received acetamide was dried in a vacuum oven at 70° C. overnight. Anhydrous aluminum chloride was used as-received. The synthesis was carried out in a glove box. About 1/20 of the amount of aluminum chloride and acetamide powders were mixed in a beaker with a magnetic stirrer. Slight heat was applied to ~50° C. while stirring, and the mixture became liquid. Then about 1/20 fraction of each solid at a time was added alternately to the beaker to continue to make the molten liquid until all ingredients were added and dissolved well. The liquid was stirred overnight and then filtered with a fine frit to remove any residual solid. The chemical composition of this liquid coordination complex liquid is shown in Table 1.

Example 2-2: Synthesis of Chloroaluminate Liquid Coordination Complex TOPO-AlCl$_3$ A liquid coordination complex made of 3:2 molar ratio of anhydrous aluminum chloride and trioctylphosphine oxide (TOPO) was prepared by using 200.3 g of anhydrous AlCl$_3$ and 386.7 g of trioctylphosphine oxide (($C_8H_{17}$)$_3$PO). As-received trioctylphosphine oxide was dried in a vacuum oven at 40° C. overnight. Anhydrous aluminum chloride was used as-received. The synthesis was carried out in a glove box. About 1/20 of the amount of aluminum chloride and trioctylphosphine oxide powders were mixed in a beaker with a magnetic stirrer. Slight heat was applied to ~50° C. while stirring, and the mixture became liquid. Then about 1/20 fraction of each solid at a time was added alternately to the beaker to continue to make the molten liquid until all ingredients were added and dissolved well. The liquid was stirred overnight and then filtered with a fine frit to remove any residual solid. The composition of this liquid coordination is shown in Table 1.

TABLE 1

Composition of Chloroaluminate Ionic Liquid and Liquid Coordination Complex Samples

| Element wt. % | Ionic Liquid [$C_4Py$][$Al_2Cl_7$] Example 1 | Liquid Coordination Complex Acetamide-$AlCl_3$ Example 2-1 | Liquid Coordination Complex TOPO-$AlCl_3$ Example 2-1 |
|---|---|---|---|
| Al | 12.4 | 15.3 | 6.8 |
| Cl | 56.5 | ~61 | 27.2 |
| C | 24.6 | 10.0 | 49.2 |
| H | 3.2 | 2.3 | 8.9 |
| N | 3.3 | 5.6 | — |
| P | — | — | 5.1 |

Example 3

Three separate mixtures of 3.0-3.5 grams of 1-butylpyridinium heptachloroaluminate ([$C_4Py$][$Al_2Cl_7$]) ionic liquid from Example 1 and 10 grams of a hydrocracker recycle oil were each stirred continuously at room temperature for 2 hours, 4 hours and 18 hours, respectively. Thereafter, the mixture was extracted with n-pentane. The mixture was transferred to a separatory funnel to separate the ionic liquid and the oil-pentane mixture. The oil-pentane mixture was collected. The pentane was evaporated in a rotary evaporator and a treated recycle oil was obtained. The treated recycle oil was then analyzed for HPNA content by HPLC. The results are summarized in Table 2.

TABLE 2

HPNA Distribution for Example 3

| HPNA Compounds | Untreated Feed (wppm) | Treated Feed/2 h (wppm) | Treated Feed/4 h (wppm) | Treated Feed/18 h (wppm) |
|---|---|---|---|---|
| Benzo[ghi]perylene | 856 | 4.5 | 3.1 | 0.5 |
| Methylbenzo[ghi]perylene | 304 | 0.5 | 0.3 | 0 |
| Coronene | 103 | 0.5 | 11 | 0.5 |
| Methylcoronene | 34 | 0 | 0 | 0 |
| Ovalene | 4.5 | 0 | 0 | 0 |
| Total | 1301.5 | 5.5 | 14.4 | 1.0 |

Example 4

A mixture of 9.5 grams of 1-butylpyridinium heptachloroaluminate ([$C_4py$][$Al_2Cl_7$]) ionic liquid from Example 1 and 50 grams of a hydrocracker recycle oil were stirred continuously at room temperature for 3 hours. Thereafter, the mixture was extracted with n-heptane. The mixture was transferred to a separatory funnel to separate the ionic liquid and the oil-heptane mixture. The oil-heptane mixture was collected. The heptane was evaporated in a rotary evaporator and a treated recycle oil was obtained. The treated recycle oil was then analyzed for HPNA content by HPLC. The results are summarized in Table 3.

TABLE 3

HPNA Distribution for Example 4

| HPNA Compounds | Untreated Feed (wppm) | Treated Feed (wppm) |
|---|---|---|
| Benzo[ghi]perylene | 1060 | 3.1 |
| Methylbenzo[ghi]perylene | 322 | 0 |
| Coronene | 167 | 0.3 |
| Methylcoronene | 27 | 0 |
| Ovalene | 4.8 | 0 |
| Total | 1580.8 | 3.4 |

Example 5

A mixture of 5.5 grams of liquid coordination complex [acetamide-$AlCl_3$] from Example 2-1 and 21.5 grams of a hydrocracker recycle oil were stirred continuously at room temperature for 2 hours. Thereafter, the mixture was extracted with n-heptane. The mixture was transferred to a separatory funnel to separate the liquid coordination complex and the oil-heptane mixture. The oil-heptane mixture was collected. The n-heptane was evaporated in a rotary evaporator and a treated recycle oil was obtained. The mixture was transferred to a separatory funnel to separate the and the oil-heptane mixture. The oil-heptane mixture was collected. The heptane was evaporated in a rotary evaporator and a treated recycle oil was obtained. The treated recycle oil was then analyzed for HPNA content by HPLC. The results are summarized in Table 4.

TABLE 4

HPNA Distribution for Example 5

| HPNA Compounds | Untreated Feed (wppm) | Treated Feed (wppm) |
|---|---|---|
| Benzo[ghi]perylene | 1060 | 2.7 |
| Methylbenzo[ghi]perylene | 322 | 0 |
| Coronene | 167 | 0.2 |
| Methylcoronene | 15 | 0 |
| Ovalene | 4.8 | 0 |
| Total | 1580.8 | 2.9 |

Example 6

A mixture of 5.5 grams of liquid coordination complex [TOPO-$AlCl_3$] from Example 2-2 and 21.5 grams of a hydrocracker recycle oil were stirred continuously at room temperature for 2 hours. Thereafter, the mixture was extracted with n-heptane. The mixture was transferred to a separatory funnel to separate the liquid coordination complex and the oil-heptane mixture. The oil-heptane mixture was collected. The n-heptane was evaporated in a rotary evaporator and a treated recycle oil was obtained. The mixture was transferred to a separatory funnel to separate the and the oil-heptane mixture. The oil-heptane mixture was collected. The heptane was evaporated in a rotary evaporator and a treated recycle oil was obtained. The treated recycle oil was then analyzed for HPNA content by HPLC.

TABLE 5

HPNA Distribution for Example 6

| HPNA Compounds | Untreated Feed (wppm) | Treated Feed (wppm) |
|---|---|---|
| Benzo[ghi]perylene | 1060 | 589 |
| Methylbenzo[ghi]perylene | 322 | 0 |
| Coronene | 167 | 70 |
| Methylcoronene | 27 | 5.4 |
| Ovalene | 4.8 | 0 |
| Total | 1580.8 | 664.4 |

The invention claimed is:

1. A process for removing a heavy polynuclear aromatic (HPNA) compound from a hydrocarbon oil, the process comprising
   (a) contacting the hydrocarbon oil comprising the HPNA compound with a lean hydrocarbon-immiscible liquid to produce a mixture comprising the hydrocarbon oil and a rich hydrocarbon-immiscible liquid comprising the HPNA compound, wherein the hydrocarbon-immiscible liquid comprises at least one of:
      (i) a halometallate ionic liquid comprising an organic cation and a halometallate anion; and
      (ii) a liquid coordination complex comprising a metal halide of formula $MX_3$, wherein M is a trivalent metal and X is a halide, and a Lewis basic donor ligand; and
   (b) separating the mixture to produce a hydrocarbon oil effluent and a hydrocarbon-immiscible liquid effluent comprising the HPNA compound.

2. The process of claim 1, wherein the hydrocarbon oil is an unconverted oil from a hydrocracking unit.

3. The process of claim 1, wherein the organic cation of the halometallate ionic liquid comprises an ammonium cation, a pyrrolidinium cation, an imidazolium cation, a pyridinium cation, phosphonium cation, or a combination thereof; and wherein the halometallate anion contains a metal selected from Al, Ga, In, Fe, Cu, Zn, or a combination thereof, and a halide selected from F, Cl, Br, I, or a combination thereof.

4. The process of claim 3, wherein the halometallate anion is a chloroaluminate anion.

5. The process of claim 1, wherein the trivalent metal (M) of liquid coordination complex is Al, Ga, or a combination thereof, and the halide (X) is selected from Cl, Br, or a combination thereof.

6. The process of claim 1, wherein the Lewis basic donor ligand is selected from compounds having a formula selected from $R^1$—C(Z)—$R^1$, $R^1$—C(O)—$ZR^1$, $R^1$—S(O)—$R^1$, $R^2NH$—C(Z)—$NHR^2$, $R^1$—C(O)—$N(R^2)_2$, $(R^3)_3P(O)$, and $R^1$—CN;
wherein:
   (a) each $R^1$ is independently a $C_1$ to $C_{10}$ alkyl group;
   (b) each $R^2$ is independently hydrogen or a $C_1$ to $C_{10}$ alkyl group;
   (c) each $R^3$ is independently a $C_4$ to $C_{10}$ alkyl group; and
   (d) Z is oxygen or sulfur.

7. The process of claim 6, wherein the Lewis basic donor ligand is selected from urea, N,N'-dimethylurea, N,N'-dimethylthiourea, acetamide, N,N-dimethylacetamide, trioctylphosphine oxide, or a combination thereof.

8. The process of claim 1, wherein a molar ratio of the metal halide to the Lewis basic donor ligand is in a range of from 1:1 to 2:1.

9. The process of claim 1, wherein the contacting step is conducted under at least one of a temperature in a range of 15° C. to 150° C., a pressure of from 100 kPa to 3 MPa, and an inert atmosphere.

10. The process of claim 1, wherein a weight ratio of the hydrocarbon oil to the lean hydrocarbon-immiscible liquid is in a range of 1:1000 to 1000:1.

11. The process of claim 1, further comprising passing at least a portion of the hydrocarbon oil effluent to a hydrocarbon conversion zone.

12. The process of claim 1, further comprising:
recycling at least a portion of the hydrocarbon-immiscible liquid effluent back to the contacting step.

13. The process of claim 1, further comprising:
regenerating at least a portion of the hydrocarbon-immiscible liquid effluent comprising the HPNA compound; and
recycling the regenerated hydrocarbon-immiscible liquid to the contacting step.

14. The process of claim 13, wherein the regenerating step comprises contacting the hydrocarbon-immiscible ionic liquid effluent comprising the HPNA compound with hydrogen under hydrocracking conditions.

15. The process of claim 13, wherein the regenerating step comprises lowering a temperature of the hydrocarbon-immiscible liquid effluent to produce a crystallized HPNA compound and a regenerated hydrocarbon-immiscible liquid; and separating the crystallized HPNA compound from the regenerated hydrocarbon-immiscible liquid effluent.

16. The process of claim 1, wherein the hydrocarbon oil effluent comprises entrained hydrocarbon-immiscible liquid.

17. The process of claim 16, further comprising:
separating the entrained hydrocarbon-immiscible liquid from the hydrocarbon oil effluent by retaining at least a portion of the entrained hydrocarbon-immiscible with a retaining material for retaining entrained hydrocarbon-immiscible liquid.

18. The process of claim 17, wherein the retaining material comprises an adsorbent selected from silica, silica gel, alumina, silica-alumina, and combinations thereof.

19. The process of claim 17, further comprising:
desorbing hydrocarbon-immiscible liquid from the adsorbent material with a desorbent.

20. The process of claim 19, further comprising:
regenerating the adsorbent material after the hydrocarbon-immiscible liquid has been desorbed from the adsorbent material.

21. The process of claim 17, further comprising:
reactivating at least a portion of the hydrocarbon-immiscible liquid that has been recovered from the retaining material.

* * * * *